Patented Dec. 8, 1936

2,063,161

UNITED STATES PATENT OFFICE 2,063,161

ASYMMETRIC INDIGOID-THIOINDIGOID COLORS

Emeric Havas, Pitman, N. J., assignor to E. I. du Pont de Nemours & Company, Wilmington, Del., a corporation of Delaware No Drawing. Application September 28, 1934, Serial No. 746,013

8 Claims. (Cl. 260—49)

This invention relates to certain indigoid-thioindigoid colors, more particularly thionaphthene-indolindigos, and a process for the production thereof. It especially relates to the production of certain asymmetric indigoid dyes in which one portion of the dyestuff is an indol group and the other portion is a thionaphthene radical of the naphthalene series.

Typical dyestuffs to which the invention especially relates are those obtainable by condensing 2:1-naphtho-oxy-thiophene with isatins, for example, halogenated isatins such as 5:7-dihalogenated isatins or some reactive derivative. One of the dyes of this type has the following formula:

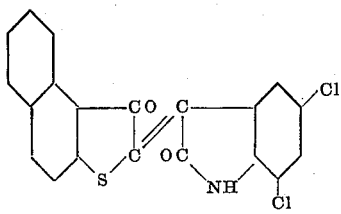

The preparation of such products is described in a patent to Bauer and Herre, U. S. No. 1,434,983.

Colors of this type have heretofore been made by combining the two components, either in alcoholic solution in the presence of basic ingredients such as sodium carbonate or piperidine as catalysts, in acetic acid with the aid of hydrochloric acid, or in neutral solvents if the isatin compound is a reactive derivative such as isatin chloride. In all of these cases, it is considered necessary to use the isolated dry thioindoxyls.

It is an object of the present invention to provide a new and improved process for preparing asymmetric dyestuffs of the thionaphthene-indolindigo type. Another object is the provision of a new and improved process for the preparation of indigoid dyes of the type having an isatin group condensed with a thionaphthene radical of the naphthalene series. A further object is to provide a new and improved process for producing brown dyestuffs of the type obtainable by condensing 2:1-naphtho-oxy-thiophene with halogenated isatins or isatin derivatives. A still further object is the provision of a process of the character above described in which the difficulties and expense incident to the isolation of the thioindoxyls is completely eliminated. Other objects will appear hereinafter.

These objects are accomplished according to the present invention by condensing an isatin compound with the aluminum compound of the thioindoxyl as obtained from the corresponding thioglycollic acid by ring-closing the acid chloride with aluminum chloride in a substantially inert solvent.

While the invention is susceptible of considerable variation and modification in the manner of its practical application, particularly as regards the type and proportions of the reacting components, it will be further illustrated by the following examples, in which the quantities are stated in parts by weight.

Example I

Thirty-eight (38) parts of beta-naphthalene-thioglycollic acid are dissolved in 500 parts of chlorobenzene. Twenty-seven (27) parts of phosphorus trichloride are added, and the solution is heated during one hour to 85° C. It is then cooled to about 30° C. Twenty-seven (27) parts of aluminum chloride are added, with good stirring, and the reaction mass is heated during one hour to 60° C.

When the reaction is completed, the aluminum compound of the thioindoxyl will be separated out as a thick paste. When no more hydrogen chloride is evolved, the mass is cooled to 40° C. and 53 parts of 2:5-dibromo-isatin are added in the form of a dry powder. The mass is again heated to 60° C., with stirring, during one hour. Water is now added and the chlorobenzene removed by steam-distillation. The color is recovered by filtration and, after washing with dilute hydrochloric acid and caustic soda, is either dried or pasted ready for standardization. The yellowish-brown color thus prepared has the formula:

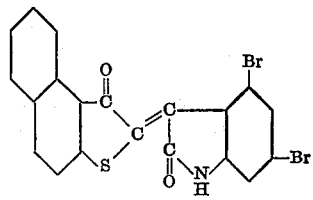

A color with similar properties can be obtained by using isatin instead of dibromo-isatin in the condensation and then brominating the final color.

Example II

Thirty-eight (38) parts of 2-methyl-4-chlorophenyl-thioglycollic acid are dissolved in 500 parts of chlorobenzene. Twenty-seven (27) parts of phosphorus trichloride are added and the solution is heated during one hour to 85° C. It is then cooled to 30° C., and 27 parts of aluminum chloride added, with good stirring. The reaction mass is heated to 60° C. during one hour, while stirring. When no more hydrochloric acid is evolved, the mass is cooled to 40° C. Fifty-three (53) parts of dibromo-isatin are added in the form of a dry powder. The reaction mass is heated and stirred during one hour at 60° C. Water is added as soon as the evolution of hydrogen chloride ceases, and the chlorobenzene is recovered by steam-distillation. The color is separated by filtration and is then washed with dilute hydrochloric acid and caustic soda solution. It is then dried or pasted in preparation for standardization.

This color forms a dark powder or paste and dyes cotton from a nearly colorless vat a Bordeaux shade.

Example III

Thirty-eight (38) parts of beta-naphthalene-thioglycollic acid are dissolved in 500 parts of chlorobenzene. Twenty-seven (27) parts of phosphorus trichloride are added, and the solution is heated about one hour to 85° C. It is then cooled to about 30° C. Twenty-seven (27) parts of aluminum chloride are added, with good stirring, and the reaction mass is heated during one hour to 60° C.

When the reaction is completed, the aluminum compound of the thioindoxyl will be separated out as a thick paste. Meanwhile, 53 parts of dibromo-isatin, 40 parts of phosphorus pentachloride and 350 parts of chlorobenzene are heated to 100° C. for one hour and then added to the paste of the aluminum compound of the thioindoxyl. The mass is again heated to about 60° C., with stirring, for one hour. Water is now added and the chlorobenzene removed by steam-distillation. The color is recovered by filtration and, after washing with dilute hydrochloric acid and caustic soda, is either dried or pasted ready for standardization. The color is brownish violet and has the following general formula:

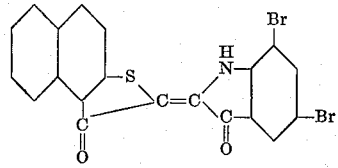

A color with similar properties can be obtained by using isatin instead of dibromo-isatin in the condensation and then brominating the final color.

The invention is not limited by the foregoing examples, since a wide variety of thioindoxyls are known and these in the form of their aluminum compounds in chlorobenzene or similar inert solvents can be condensed with either isatin or isatin derivatives to form valuable colors. The following tables will illustrate other reacting components and the products derived therefrom, the thionaphthene reacting component being described in the form of its thioglycollic acid. Table I illustrates various compounds formed when the isatin compound is of the type

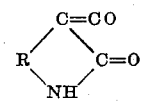

where R is an aromatic nucleus, the reaction in this case being known as the "beta" condensation since it occurs in the "beta" or "3- position." Table II illustrates various compounds formed when the isatin compound is a reactive isatin derivative, such as, for example, isatin chloride, the reaction in this case being known as the "alpha" condensation because it occurs in the "alpha" or "2- position."

Table I

| Thioglycollic acid | Isatin compound | Dyestuff |
|---|---|---|
| Phenyl-thioglycollic acid | Isatin | 2:3'-thionaphthene-indolindigo |
| Phenyl-thioglycollic acid | 2:5-dichloro-isatin | 5:7-dichloro-3:2'-indol-thionaphthene-indigo |
| Phenyl-thioglycollic acid | Dibromo-isatin | 5:7-dibromo-3:2'-indol-thionaphthene-indigo |
| 2:5-dimethyl-4-chloro-thioglycollic acid | Isatin | 4:7-dimethyl-5-chloro-2:3'-thionaphthene-indolindigo |
| 2:5-dimethyl-4-chloro-thioglycollic acid | 2:5-dichloro-isatin | 4:7-dimethyl-5:5':7'-trichloro-2:3'-thionaphthene-indolindigo |
| 2:5-dimethyl-4-chloro-thioglycollic acid | Dibromo-isatin | 4:7-dimethyl-5-chloro-5':7'-dibromo-2:3'-thionaphthene-indol-indigo |
| 2-methyl-4-chloro-phenyl-thioglycollic acid | Isatin | 5-chloro-7-methyl-2:3'-thionaphthene-indolindigo |
| 2-methyl-4-chloro-phenyl-thioglycollic acid | Dichloro-isatin | 5:5':7'-trichloro-7-methyl-2:3'-thionaphthene-indolindigo |
| 2-methyl-4-chloro-phenyl-thioglycollic acid | 4:6-dimethyl-5:7-dichloro-isatin | 4:6:7'-trimethyl-5:5':7-trichloro-3:2'-indol-thionaphthene-indigo |
| Beta-naphthalene-thioglycollic acid | 4:6-dimethyl-5:7-dichloro-isatin | 4:6-dimethyl-5:7-dichloro-2:3'-indol-naphthionaphthene-indigo |
| 2-thioglycol-4-chloro-naphthalene | Isatin | 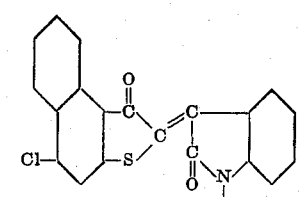 |
| 1-thioglycol-8-chloro-naphthalene | Bromo-isatin | 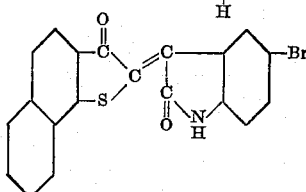 |

Table II

| Thioglycollic acid | Isatin compound | Dyestuff |
| --- | --- | --- |
| Phenyl-thioglycollic acid | Isatin chloride | 2:2'-thionaphthene-indolindigo |
| Phenyl-thioglycollic acid | 2:5-dichloro-isatin chloride | 5:7-dichloro - 2:2'-indol - thionaphthene-indigo |
| Phenyl-thioglycollic acid | Dibromo-isatin chloride | 5:7-dibromo-2:2'-indol - thionaphthene-indigo |
| 2:5-dimethyl-4-chloro-thioglycollic acid | Isatin chloride | 4:7-dimethyl-2-chloro-2:2' - thionaphthene-indolindigo |
| 2:5-dimethyl-4-chloro-thioglycollic acid | 2:5-dichloro-isatin chloride | 4:7-dimethyl-5:5':7'-trichloro-2:2'- thio-naphthene-indolindigo |
| 2:5-dimethyl-4-chloro-thioglycollic acid | Dibromo-isatin chloride | 4:7 - dimethyl - 5 - chloro - 5':7' - dibromo - 2:2' - thionaphthene - indol - indigo |
| 2-methyl - 4- chloro - phenyl - thioglycollic acid | Isatin chloride | 5 - chloro - 7 - methyl - 2:2' - thionaphthene-indolindigo |
| 2-methyl - 4 - chloro - phenyl - thioglycollic acid | Dichloro-isatin chloride | 5:5':7'-trichloro-7-methyl - 2:2' - thio-naphthene-indolindigo |
| 2-methyl - 4 - chloro - phenyl - thioglycollic acid | 4:6 - dimethyl - 5:7 - dichloro - isatin chloride | 4:6:7' - trimethyl - 5:5':7 - trichloro - 2:2'-indol-thionaphthene-indigo |
| Beta-naphthalene-thio-glycollic acid | 4:6-dimethyl - 5:7 - dichloro - isatin chloride | 4:6 - dimethyl - 5:7 - dichloro - 2:2' - in-dolnaphthionaphthene-indigo |
| 2-thioglycol-4-chloro-naphthalene | Isatin chloride | *(structure shown)* |
| 1-thioglycol-8-chloro-naphthalene | Bromo-isatin chloride | *(structure shown)* |

Similarly, other unsymmetrical indigoid dyes of this type may be prepared, including those containing as substituents in their aromatic nuclei alkyl groups (e. g., methyl, ethyl, isopropyl, butyl, hexyl, lauryl, etc.); halogen atoms (e. g., chlorine, bromine and fluorine); and one or more trifluoromethyl ($CF_3$) groups. The invention is especially desirable in the preparation of unsymmetrical dyes of the type described containing halogen atoms and/or alkyl groups in at least one of the aromatic nuclei, especially the brown dyestuffs of the type described in Example I.

As further examples of inert solvents which may be employed in accordance with the present invention may be mentioned benzene, toluene, xylene, dichlorobenzene and similar solvents, chlorobenzene, however, being preferred.

The process is very advantageous because it simplifies the preparation of certain dyestuffs of commercial importance. It is especially desirable in the "beta" isatin type of condensation in that it eliminates the difficulties and expense incident to the preparation of the thioindoxyls in the usual process of preparing asymmetric dyes of this type, because acetic acid or alcohol ordinarily used in this type of condensation are either lost or have to be purified, if recovered.

As many apparent and widely different embodiments of this invention may be made without departing from the spirit and scope thereof, it is to be understood that I do not limit myself to the specific embodiments thereof except as defined in the appended claims.

I claim:

1. The process of preparing asymmetric dyestuffs of the thionaphthene-indolindigo type which comprises reacting an isatin compound with a solvent mixture of the aluminum compound of a thioindoxyl as obtained without isolation from the corresponding thioglycollic acid by ring-closing the acid chloride with aluminum chloride in an inert solvent.

2. The process of claim 1 in which the isatin compound is a halogenated isatin.

3. The process of claim 1 in which the thioglycollic acid is a naphthalene-thioglycollic acid.

4. The process of claim 1 in which the solvent is chlorobenzene.

5. The process of producing an indigoid dyestuff of the asymmetric type which comprises dissolving an aryl-thioglycollic acid in a substantially inert solvent, heating the resultant solution with phosphorus trichloride, adding aluminum chloride, and heating the resultant mixture containing the aluminum compound of the thioindoxyl with an isatin compound.

6. The process of producing an indigoid dyestuff of the asymmetric type which comprises dissolving a naphthalene-thioglycollic acid in a substantially inert solvent for the thioglycollic acid, heating the resultant solution with phosphorus trichloride, adding aluminum chloride, and heating the resultant mixture containing the aluminum compound of the thioindoxyl with a halogenated isatin compound.

7. The process of producing a brown indigoid dyestuff of the asymmetric type which comprises dissolving beta-naphthalene-thioglycollic acid in chlorobenzene, heating the resultant solution with phosphorus trichloride, then adding aluminum chloride, and heating the resultant mixture containing the aluminum compound of the thioindoxyl with 2:5-dibromo-isatin.

8. The process which comprises dissolving about 38 parts of beta-naphthalene-thioglycollic acid in about 500 parts of chlorobenzene, adding 27 parts of phosphorus trichloride, heating the resultant solution for about one hour to about 85° C., then cooling to about 30° C., adding about 27 parts of aluminum chloride with stirring, heating the reaction mass to about 60° C. and, when no more hydrogen chloride is evolved, cooling to about 40° C. and adding about 53 parts of 2:5-dibromo-isatin in the form of a dry powder, then again heating to about 60° C. for about one hour, adding water, steam-distilling the chlorobenzene, and separating the dyestuff.

EMERIC HAVAS.

Certificate of Correction

Patent No. 2,063,161.          December 8, 1936.

EMERIC HAVAS

It is hereby certified that errors appear in the printed specification of the above numbered patent requiring correction as follows: Page 2, second column, line 58, in the last column of Table I, after "-dichloro-", for "2 : 3'" read *3 : 2'*; and lines 70 to 74, same table, in the formula, the lower aromatic nucleus should appear as

instead of as shown in the patent; and that the said Letters Patent should be read with these corrections therein that the same may conform to the record of the case in the Patent Office.

Signed and sealed this 23rd day of March, A. D. 1937.

[SEAL]

HENRY VAN ARSDALE,
*Acting Commissioner of Patents.*